United States Patent
Ryon et al.

(10) Patent No.: US 12,031,482 B2
(45) Date of Patent: Jul. 9, 2024

(54) TORCH IGNITORS WITH GAS ASSIST START

(71) Applicant: Collins Engine Nozzles, Inc., Des Moines, IA (US)

(72) Inventors: Jason A. Ryon, Carlisle, IA (US); Brandon Phillip Williams, Johnston, IA (US)

(73) Assignee: Delavan, Inc., Des Moines, IA (US)

( * ) Notice: Subject to any disclaimer, the term of this patent is extended or adjusted under 35 U.S.C. 154(b) by 0 days.

(21) Appl. No.: 18/210,139

(22) Filed: Jun. 15, 2023

(65) Prior Publication Data

US 2023/0323811 A1  Oct. 12, 2023

Related U.S. Application Data (62) Division of application No. 17/133,054, filed on Dec. 23, 2020, now Pat. No. 11,708,793.

(51) Int. Cl.
*F02C 7/264* (2006.01)
*F02C 3/00* (2006.01)
(Continued)

(52) U.S. Cl.
CPC .................. *F02C 7/04* (2013.01); *F02C 3/00* (2013.01); *F02C 7/264* (2013.01); *F23R 3/002* (2013.01);
(Continued)

(58) Field of Classification Search
CPC .............. F02C 7/264; F23Q 9/00; F02P 21/00
See application file for complete search history.

(56) References Cited

U.S. PATENT DOCUMENTS 3,954,389 A  5/1976 Szetela
4,112,675 A  9/1978 Pillsbury et al.
(Continued)

FOREIGN PATENT DOCUMENTS

DE  102018214281 B3  8/2019
GB  788557 A  1/1958
(Continued)

OTHER PUBLICATIONS

Partial European Search Report dated May 19, 2022, issued during the prosecution of European Patent Application No. EP 21216405.7.
(Continued)

*Primary Examiner* — Gerald L Sung
(74) *Attorney, Agent, or Firm* — Kinney & Lange, P.A.

(57) ABSTRACT

An embodiment of a torch ignitor system for combustor of a gas turbine engine includes a torch ignitor, the torch ignitor having a combustion chamber oriented about an axis, the combustion chamber having axially upstream and downstream ends defining a flow direction through the combustion chamber, along the axis. The torch ignitor system also includes a cap defining the axially upstream end of the combustion chamber and oriented about the axis, wherein the cap is configured to receive a fuel injector and at least one glow plug, a tip at a downstream end of the combustion chamber, and a passage for pressurized oxygen containing gas passing through the cap from an exterior of the combustion chamber and in fluid communication with the combustion chamber. An embodiment of a method for starting a gas turbine engine is also disclosed.

5 Claims, 6 Drawing Sheets

(51) Int. Cl.
  *F02C 7/04* (2006.01)
  *F23R 3/00* (2006.01)
  *F23R 3/34* (2006.01)

(52) U.S. Cl.
  CPC .......... *F23R 3/343* (2013.01); *F05D 2220/32* (2013.01); *F23R 2900/03343* (2013.01)

(56) References Cited

U.S. PATENT DOCUMENTS

| | | | |
|---|---|---|---|
| 4,301,656 | A | 11/1981 | Stettler |
| 4,860,533 | A | 8/1989 | Joshi |
| 5,085,040 | A | 2/1992 | Tilston |
| 7,137,255 | B2 | 11/2006 | Schmotolocha et al. |
| 9,567,912 | B2 | 2/2017 | Prociw et al. |
| 2004/0168442 | A1 | 9/2004 | Schmotolocha et al. |
| 2005/0053876 | A1 | 3/2005 | Joos et al. |
| 2008/0264372 | A1* | 10/2008 | Sisk .................... F02K 9/42 123/146.5 R |
| 2008/0299504 | A1* | 12/2008 | Horn .................... F02C 7/264 431/267 |
| 2014/0366505 | A1 | 12/2014 | Prociw et al. |
| 2016/0047318 | A1 | 2/2016 | Dam et al. |
| 2019/0010872 | A1 | 1/2019 | Dam et al. |
| 2019/0032561 | A1 | 1/2019 | Stoia et al. |
| 2020/0309378 | A1 | 10/2020 | Dam et al. |
| 2021/0215100 | A1 | 7/2021 | Head et al. |

FOREIGN PATENT DOCUMENTS

| | | |
|---|---|---|
| GB | 859184 A | 1/1961 |
| GB | 869652 A | 6/1961 |

OTHER PUBLICATIONS

Extended European Search Report dated Sep. 12, 2022, issued during the prosecution of European Patent Application No. EP 21216405.7.

* cited by examiner

TORCH IGNITORS WITH GAS ASSIST START

CROSS-REFERENCE TO RELATED APPLICATIONS

This is a divisional of U.S. patent application Ser. No. 17/133,054 filed Dec. 23, 2020, the content of which is incorporated by reference herein in its entirety.

BACKGROUND

The present disclosure relates to gas turbine engines and, more particular, to torch ignitors and methods suitable for use in torch ignitors used in the combustor section of a gas turbine engine.

Torch ignitors can be used in lieu of spark ignitors to provide an ignition source for combustors located in gas turbine engines. Torch ignitors provide a flame to the combustion chamber of a gas turbine engine as an ignition source rather than the electric current provided by spark ignitors. Consequently, torch ignitors can provide a larger target for fuel injectors within the combustor, allowing for utilization of a greater range of fuel injector designs. Torch ignitors are intended to remain active while the gas turbine is operating. There may be instances where a torch ignitor can be useful for starting a gas turbine engine but where it is not easily feasible to start off of the gas turbine's compressor. In these instances it is advantageous to have extra aid to starting the torch ignitor, which can then be used to start the main combustor of the gas turbine engine.

SUMMARY

The present disclosure provides an embodiment of a torch ignitor system for a combustor of a gas turbine engine. The system includes a torch ignitor, the torch ignitor including a torch wall oriented about an axis, the torch wall having axially upstream and downstream ends defining a flow direction through the combustion chamber, along the axis. The torch ignitor also includes a cap defining the axially upstream end of the combustion chamber and oriented about the axis, wherein the cap is configured to receive a fuel injector and at least one glow plug; a tip defining the axially downstream end of the combustion chamber, and a passage for pressurized oxygen containing gas passing through the cap from an exterior of the combustion chamber and in fluid communication with the combustion chamber.

The present disclosure additionally provides for a method that includes issuing liquid from a fuel injector into a combustion chamber of a torch ignitor, issuing air assist from the fuel injector into the combustion chamber, issuing a separate stream of assist gas into the combustion chamber, igniting a fuel air mixture within the torch wall, and reducing the separate stream of assist gas into the combustion chamber after the fuel air mixture is ignited.

DETAILED DESCRIPTION

The present disclosure presents structures and methods for starting a torch ignitor suitable for igniting the combustor of a gas turbine engine.

The following are non-exclusive descriptions of possible embodiments of the present disclosure. At certain times, such as an emergency start, one time starts, or emergency altitude relights, a torch ignitor may be used to start the gas turbine engine, however these instances pose a challenge in starting the gas turbine engine if relying on the gas turbine engine compressor. Thus, it is advantageous to have additional aid in starting the torch ignitor in order to start the gas turbine engine in such circumstances, such as an external source of compressed oxygen containing gas. The systems and methods disclosed herein allow for starting a torch ignitor, and the main combustor of the gas turbine, under suboptimal conditions.

Figure 1:
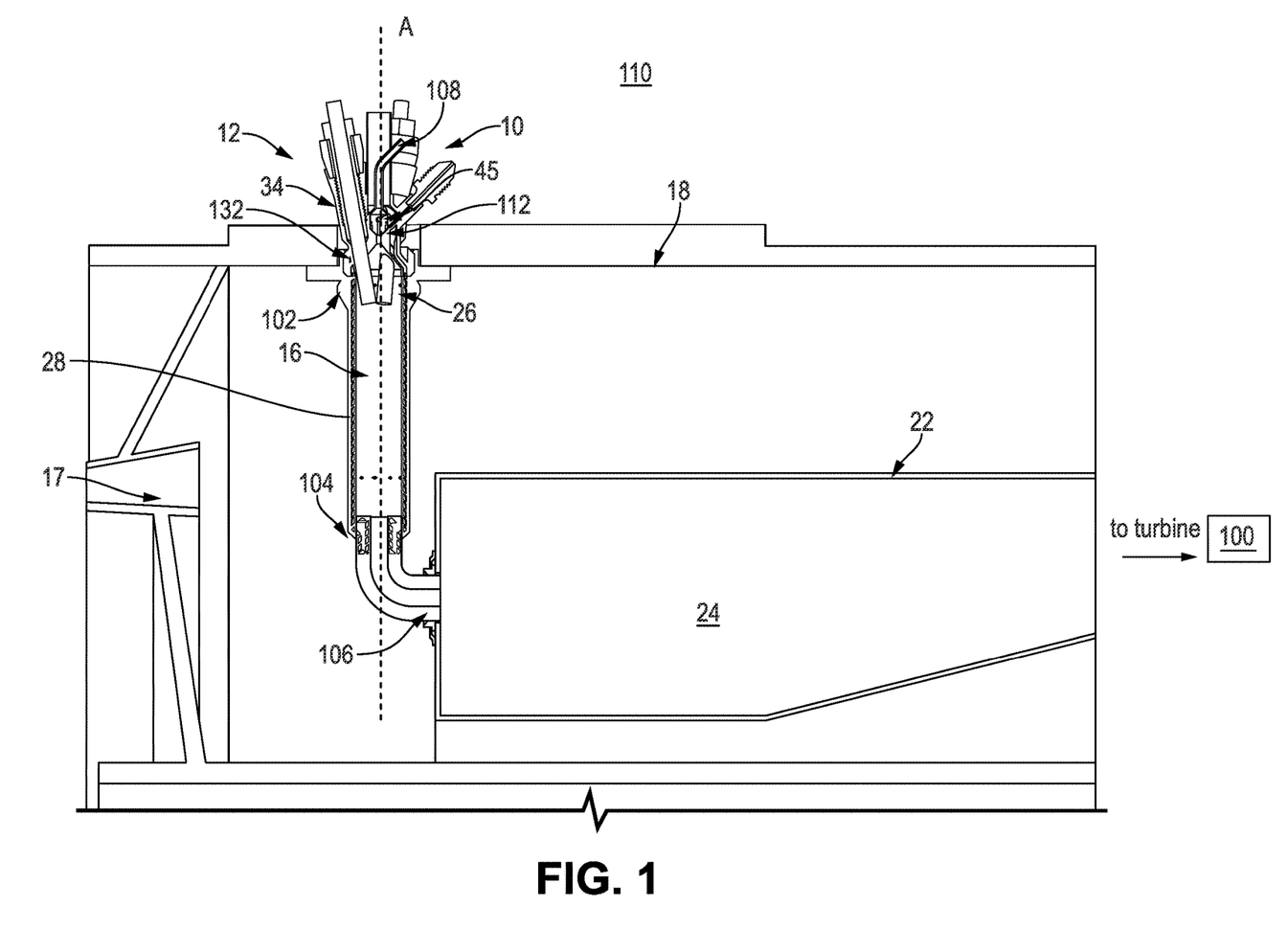
FIG. 1 is a cross-sectional side elevation view of an example of a torch ignitor within the combustion section of a gas turbine engine.

FIG. 1 is a cross sectional view of a torch ignitor 10 for a combustor 24 of a gas turbine engine 100. The torch ignitor 10 can comprise a torch wall 16 (e.g. a combustion chamber for the torch ignitor 10) oriented about an axis A, and the torch wall 16 can have axially upstream and downstream ends 102, 104 defining a flow direction through the torch wall 16, along the axis A. A cap 34 (also shown in FIGS. 2-4) can define the axially upstream end of the torch wall 16 and can also be oriented about the axis A. The cap 34 may be separable from the torch wall 16, or may be formed integrally with the torch wall 16. In the example shown in FIG. 1, the cap 34 can be configured to receive a fuel injector 45, at least one glow plug 26, a tip 106 at a downstream end of the torch wall 16, and a passage 108 for pressurized oxygen containing gas (e.g. assist gas). In the passage 108, pressurized oxygen containing gas can pass through the cap 34 from an exterior of the torch wall 16 where the pressurized oxygen containing gas can be in fluid communication with the torch wall 16. It is contemplated however that assist gas may be issued through the both the fuel injector 45, features within the cap section 34, and/or through the torch wall 16 to reach the combustion chamber interior to the torch wall 16.

In operation, air enters the high pressure engine case 18 through inlet 17 (e.g. from a main engine compressor). Torch ignitor 10 intakes high pressure air from the inside of high-pressure engine case 18. The high-pressure air is channeled through cooling channels 28 to cool torch wall 16 before it is channeled into combustion chamber contained by torch wall 16 to be used in combustion within torch ignitor 10 (for example as shown in the enlarged view in FIG. 2).

The upstream end 102 of the torch ignitor 10 may be mounted to a high pressure engine case 18 (e.g. using mounting features within high pressure casing 18) while the tip 106 may be mounted to a main combustor 24 within the high pressure engine case 18. The cap 34 may be mounted to upstream end 102 through aperture 132 in high pressure case 18 by threads or other suitable means of retention. In this way, it is possible for the main combustor 24 to be in fluid communication with combustion products from within the torch wall 16, where the combustion products are produced from fuel and pressurized oxygen containing gas from sources outside the high pressure engine case 18. In operation, the combustion products produced within the torch wall 16 can flow into the gas turbine combustor (e.g. main combustor 24), and eventually used to start the turbine, as indicated by the "to turbine" arrow.

Figure 2:
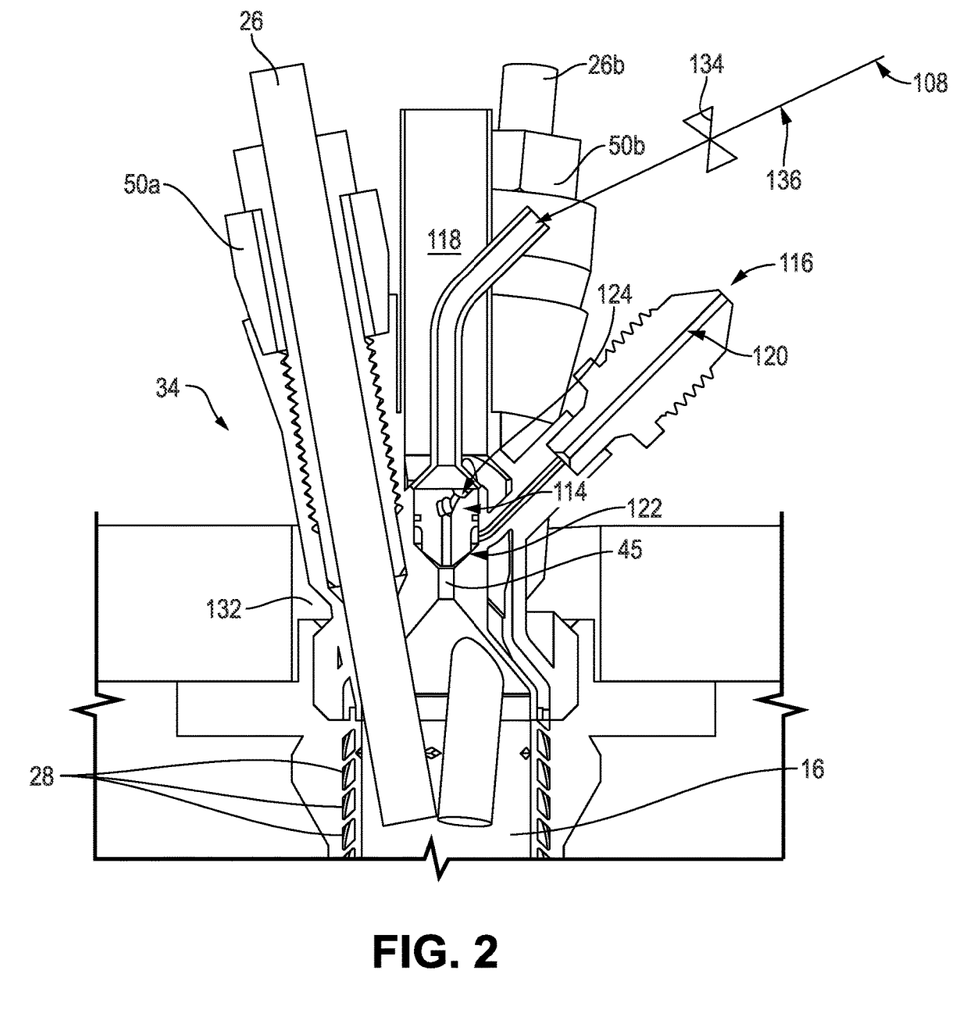
FIG. 2 is a cross-sectional side elevation view of a cap of the torch ignitor of FIG. 1, showing a gas assist path in accordance with at least one aspect of this disclosure.

In embodiments, such as the example shown in FIG. 2, the torch ignitor 10 can include a fuel injector seat 112 defined in the cap 34. The fuel injector seat 112 can be configured to receive the fuel injector 45 and to provide a passage for injecting fuel, air, and/or assist gas from an external source 136 through the fuel injector 45 and into the torch wall 16. It is also possible that the torch ignitor 10 can include at least one glow plug seat 50 defined in the cap 34. The glow plug seat 50 can be comprised of multiple components, such as a housing and sheath, however for the sake of simplicity, the structure will be hereinafter referred to as the glow plug seat 50. The glow plug seat 50 can be configured to receive the glow plug 26 through the cap 34 where the glow plug 26 can extend through the cap 34 and through the torch wall 16 to initiate ignition in fuel and air within the torch wall 16. It is contemplated that the glow plug seat 50 can be a first glow plug seat 50a in a plurality of glow plug seats 50a,b. As shown throughout the FIGS., glow plug seats 50a,b are shown circumferentially spaced apart from one another around the axis A, such that an air passage 118 can be defined in the cap 34 radially inward from the glow plug seats 50a,b. The examples presented in the FIGS. and described herein provide for at least one glow plug 26 and corresponding seat 50, for example, two glow plugs 26a,b; however it should be appreciated by those skilled in the art that any suitable number of glow plugs 26 (and corresponding glow plug seats 50) can be employed.

In embodiments, such as the example shown in FIG. 2, the fuel injector 45 can include a fuel injector seat 112, an air inlet 114, and a separate fuel inlet 116. The cap 34 can include a separate air passage 118 in fluid communication with the air inlet 114 of the fuel injector 45 and a liquid fuel passage 120 in fluid communication with the fuel inlet 116 of the fuel injector 45. The cap 34 can also include a separate gas passage 108, that can be in fluid communication with the fuel injector 45 for providing pressure-assist to the fuel injector 45 from an external source 136.

The tip 106 of the torch ignitor 10 can be connected to the main combustor 24 to discharge combustion products from within torch wall 16 to the main combustor 24 for ignition of a fuel/air mixture in the main combustor 24. The external source 136 of pressurized gas, external of the high pressure engine case 18, can be connected in fluid communication with the air passage 118 of the cap 34. Further, the source of liquid fuel, external of the high pressure engine case 18, can also be connected in fluid communication with the fuel injector 45 in the cap 34. In addition, the external source 136 of pressurized oxygen containing gas, can also be connected in fluid communication with the cap 34 to provide pressure-assisting gas from the source of pressurized gas to initiate combustion within the torch wall 16.

In embodiments, the external source 136 can be an external source of pressurized oxygen containing gas, for example. More particularly, the external source 136 can be a line run from an onboard compressed air system, or from a small pressurized compressed gas source (e.g. a replaceable and/or rechargeable bottle) which may activated by a valve (e.g. valve 134). It is contemplated that a rechargeable bottle may be recharged from the main engine compressor 17 at a high pressure operation (i.e. takeoff condition) so that it is available for the next start or restart sequence. While not specifically described herein, it should be appreciated by those skilled in the art that various methods of activating the compressed gas supply to the torch ignitor can be used, for example a solenoid to rupture an aperture of the compressed gas tank, or a solenoid valve to open a compartment, among other suitable methods.

Referring FIG. 2, the separate gas passage 108 of the cap 34 can be in fluid communication with the air inlet 114 of the fuel injector 45 so that gas from both the gas passage 108 of the cap 34 and air from the air passage 118 can both feed into an inlet 124 of the fuel injector 45. For example, compressed gas from an external source 136 can be inserted directly into the stream of air from air passage 118, through separate gas passage 108. The compressed oxygen containing gas can then be used for atomizing fuel, and as the compressed oxygen containing gas source (e.g. from the main engine compressor 17) becomes adequate, the compressed oxygen containing gas supply can be reduced and/or turned off via a valve 134. When gas from the compressed gas source is also used for atomization, such as shown in FIG. 2 for example, air from the main engine compressor 17 can then take over operation of the compressed gas circuit once the gas turbine engine 100 is started and the main engine compressor 17 is adequate.

Figure 3:
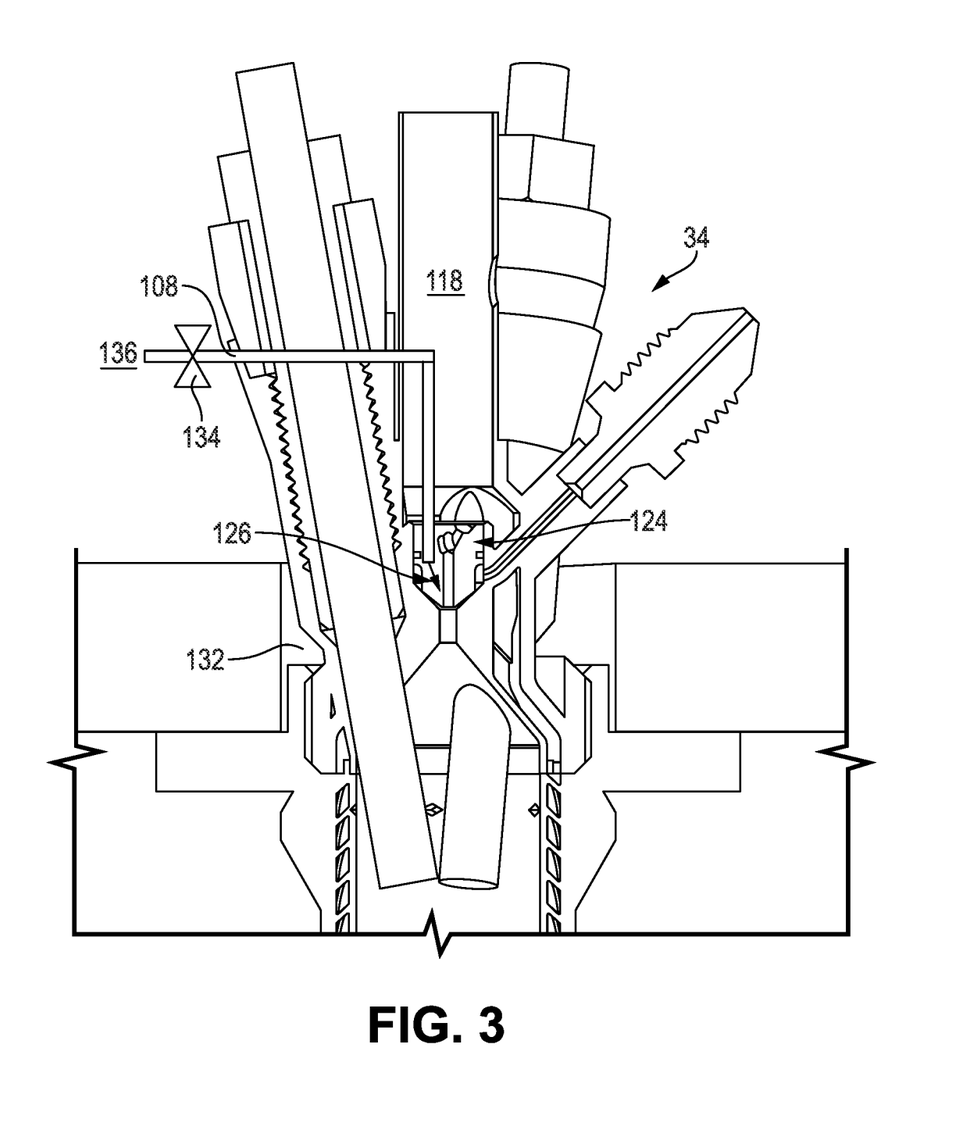
FIG. 3 is a cross-sectional view of a cap of a torch ignitor showing another gas assist path in accordance with at least one aspect of this disclosure.

Referring to FIG. 3, the separate gas passage 108 of the cap 34 can be connected to the fuel injector 45 at an assist gas port 126 of the fuel injector 45. The assist gas port 126 and separate gas passage 108 can be a separate gas passage 124 of the fuel injector 45 so that air from the air passage 118 of the cap 34 remains separate from gas in the separate gas passage 108 of the cap 34 upstream of the fuel injector 45. Here, the compressed oxygen containing gas can be injected into the fuel injector inlet 114 through a circuit (e.g. separate gas passage 108) directly into the fuel injector 45, where the separate gas passage 108 is separate from the compressed air used for atomization (e.g. the air flowing through the air passage 118). As shown in both examples in FIGS. 2-3, the separate gas passage 108 through the cap 34 can be at least partially within the air passage 118 of the cap 34.

Figure 4:
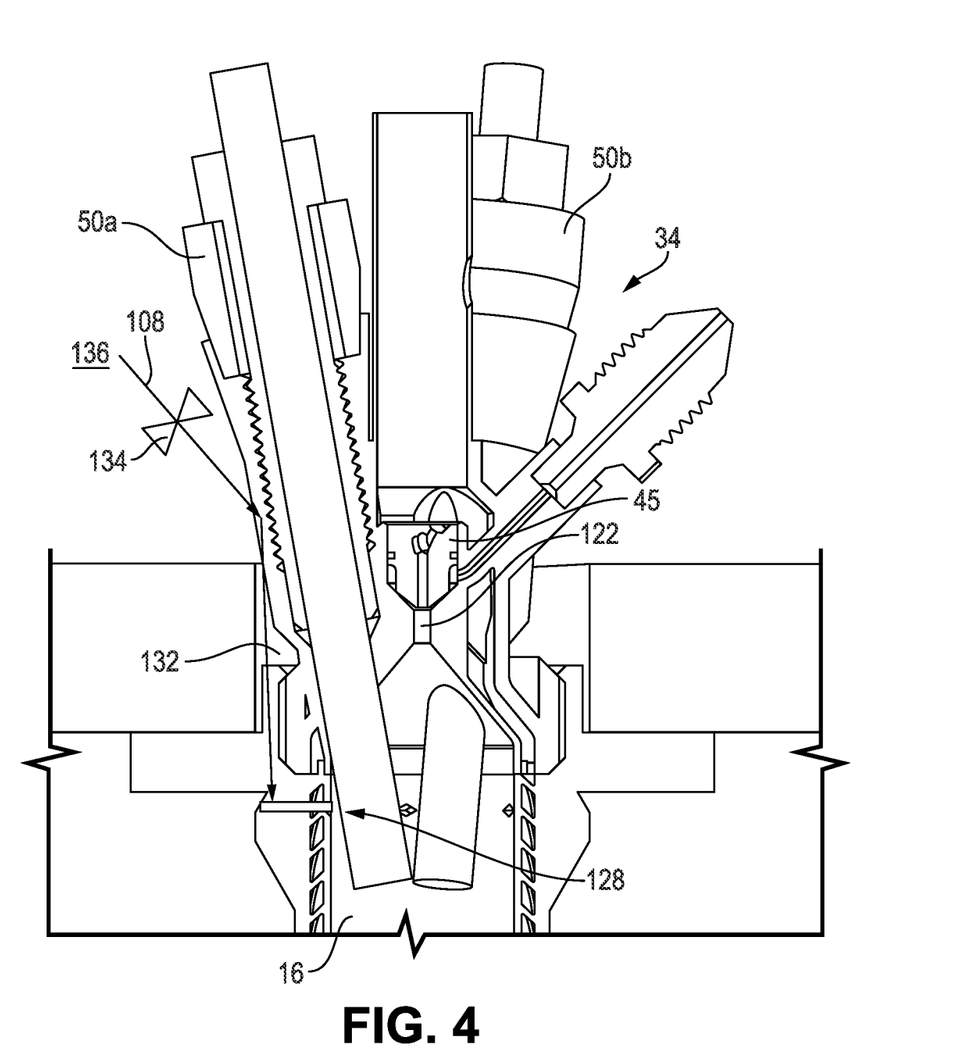
FIG. 4 is a cross-sectional view of a cap of a torch ignitor showing yet a another gas assist path accordance with at least one aspect of this disclosure.

In further embodiments, such as the example shown in FIG. 4, the cap 34 can also include a separate gas passage 108, where the separate gas passage 108 through the cap 34 can be lateral from the glow plug seats 50a,b relative to the axis A. As such, the separate gas passage 108 can be in fluid communication with an outlet 128 in the torch wall 16, where the outlet is downstream of the fuel injector exit 122. For example, compressed oxygen containing gas can be injected into the torch ignitor torch wall 16 via separate gas passage 108. In such a configuration, the compressed oxygen containing gas is may not be used for atomization of the fuel but may provide sufficient compressed oxygen containing gas for reacting with fuel within the torch wall 16.

Figure 5:
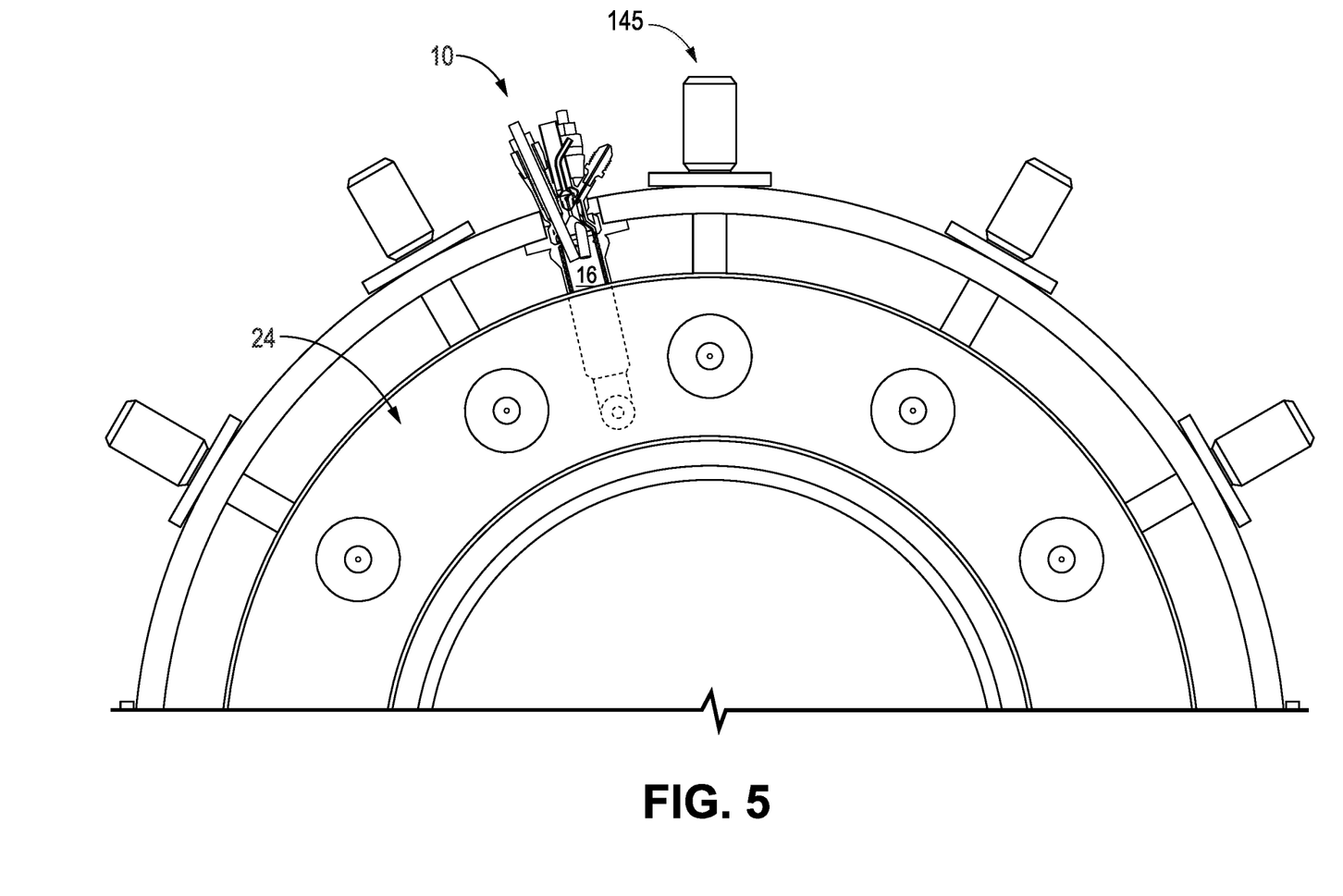
FIG. 5 is a cross-sectional front view of a combustor looking upstream showing the torch ignitor of FIG. 1.

It is possible that each torch ignitor 10 includes its own fuel injector 45, and that the main combustor 24 includes a plurality of main fuel injectors 145. It is also contemplated that the system 1 can include a plurality of torch ignitors 10 spaced between respective main fuel injectors 145 such as shown in FIG. 5. For each torch ignitor 10, the torch wall 16 can be outside of the main combustor 24, while none of the main fuel injectors 145 includes a combustion chamber outside of the main combustor 24.

In embodiments, the torch ignitor 10 can include control valve 134 in line between the source 136 of pressurized oxygen containing gas and the cap 34 for controlling supply from the source 136 of pressurized oxygen containing gas to the cap 34. The source 136 of oxygen containing gas can be any of a source of oxygen or air, for example, roughly 21% oxygen, 79% nitrogen for an air source, or 100% oxygen for an oxygen source, however as appreciated by those skilled in the art, any suitable oxygen containing gas or combination thereof can be used.

Figure 6:
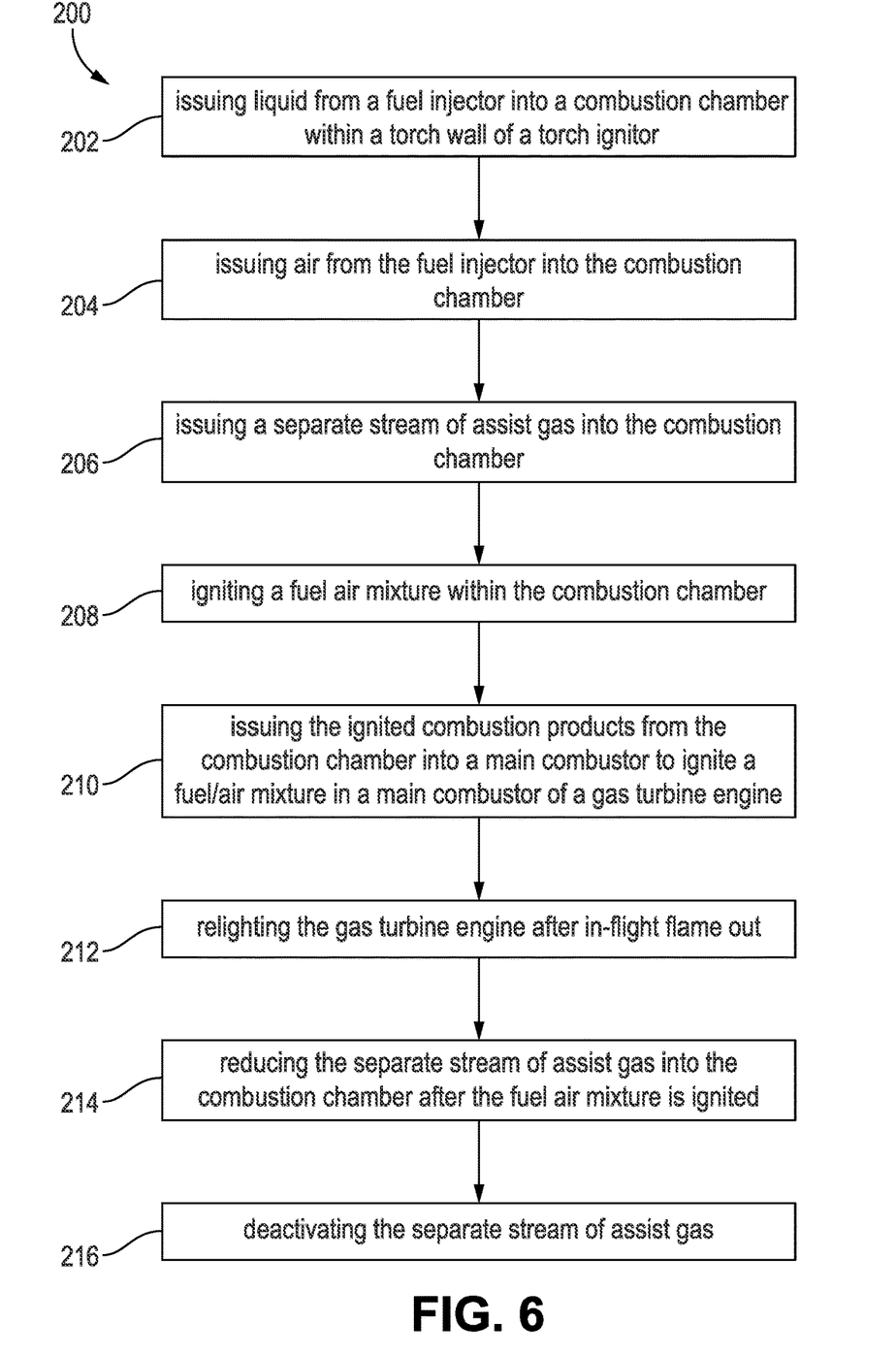
FIG. 6 is a block diagram of an example of a method for starting a turbine engine.

FIG. 6 shows a block diagram of a method 200 for starting a gas turbine engine 100, using a torch ignitor system as described above. At box 202, the method 200 can include issuing liquid (e.g. liquid fuel from the liquid fuel passage 116) from a fuel injector 45 within torch wall 16 of a torch ignitor 10. Next, at box 204, the method 200 can include issuing air (e.g. air from the air inlet passage 118) from the fuel injector 45 into the torch wall 16. At box 206, the method 200 can include issuing a separate stream of assist gas (e.g. assist gas from separate gas passage 108) into the torch wall 16. The method 200 can include, as shown at box 208, igniting a fuel air mixture within the torch wall 16, and at box 202, using flame issued from the torch wall 16 to ignite a fuel/air mixture in a combustor 24 of a gas turbine engine 100. The method 200 can include issuing the ignited combustion products from the combustion chamber into a main combustor to ignite a fuel/air mixture in a main combustor of a gas turbine engine, at box 210. At box 212, using flame issued from the torch wall 16 can also include relighting the gas turbine engine after in-flight flame out, for example an emergency relight at altitude. At box 214, the method 200 can include reducing the separate stream of assist gas into the torch wall 16 after the fuel air mixture is ignited. It is contemplated that reducing the separate stream of assist gas (e.g. box 214) can includes completely deactivating the separate stream of assist gas, as shown at box 216, when a supply of assist gas is no longer needed. The compressed oxygen containing gas is only required to start the reaction, and can therefore be stopped once the reaction is sustained.

Discussion of Possible Embodiments

The following are non-exclusive descriptions of possible embodiments of the present disclosure.

An embodiment of a torch ignitor system for combustor of a gas turbine engine includes a torch ignitor, the torch ignitor having a combustion chamber oriented about an axis, the combustion chamber having axially upstream and downstream ends defining a flow direction through the combustion chamber, along the axis. The torch ignitor system also includes a cap defining the axially upstream end of the combustion chamber and oriented about the axis, wherein the cap is configured to receive a fuel injector and at least one glow plug, a tip at a downstream end of the combustion chamber, and a passage for pressurized oxygen containing gas passing through the cap from an exterior of the combustion chamber and in fluid communication with the combustion chamber.

The system of the preceding paragraph can optionally include, additionally and/or alternatively, any one or more of the following features, configurations and/or additional components:

A torch ignitor system for combustor of a gas turbine engine according to an exemplary embodiment of this disclosure, among other possible things, includes the upstream end mounted to a high pressure engine case and the tip is mounted to a main combustor within the high pressure case for fluid communication combustion products into the combustor.

A further embodiment of the foregoing system can further comprise, a fuel injector seat defined in the cap configured to receive the fuel injector and provide passage for injecting fuel and gas from an external source through the fuel injector into the combustion chamber, and at least one glow plug seat defined in the cap configured to receive a respective glow plug of the at least one glow plug through the cap and into the combustion chamber for initiating ignition in fuel and air in the combustion chamber.

A further embodiment of any of the foregoing systems, wherein the fuel injector includes an air inlet and a separate fuel inlet, wherein the cap includes an air passage in fluid communication with the air inlet of the fuel injector and a liquid fuel passage in fluid communication with the fuel inlet of the fuel injector, and wherein the cap includes a separate gas passage therethrough, wherein the separate gas passage is in fluid communication with the fuel injector for providing pressure-assist to the fuel nozzle from an external source of pressurized oxygen containing gas.

A further embodiment of any of the foregoing systems, wherein the separate gas passage of the cap is in fluid communication with the air inlet of the fuel injector so that gas from both the gas passage of the cap and from the air passage both feed into the inlet of the fuel injector.

A further embodiment of any of the foregoing systems, wherein the separate gas passage of the cap is connected to the fuel injector at an assist gas port of the fuel injector that is separate from the inlet of the fuel injector keeping air from the air passage of the cap separate from gas in the separate gas passage of the air cap upstream of the fuel injector.

A further embodiment of any of the foregoing systems, wherein the fuel injector includes an air inlet and a separate fuel inlet, wherein the cap includes an air passage in fluid communication with the air inlet of the fuel injector and a liquid fuel passage in fluid communication with the fuel inlet of the fuel injector, and wherein the cap includes a separate gas passage therethrough with an outlet in the combustion chamber downstream of a fuel nozzle.

A further embodiment of any of the foregoing systems, wherein the at least one glow plug seat is a first glow plug seat in a plurality of glow plug seats defined through the cap, wherein the glow plug seats are circumferentially spaced apart from one another around the axis, wherein an air passage in fluid communication with the air inlet of the fuel injector is defined in the cap radially inward from the glow plug seats.

A further embodiment of any of the foregoing systems, wherein the cap includes a separate gas passage therethrough that is at least partially within the air passage of the cap.

A further embodiment of any of the foregoing systems, wherein the cap includes a separate gas passage therethrough that is lateral from the glow plug seats relative to the axis.

An embodiment of a torch ignitor system for combustor of a gas turbine engine can further comprise a high pressure engine case, wherein the cap is mounted to an opening through the high pressure engine case, a main combustor, wherein the tip is connected to discharge combustion products into the main combustor, a source of pressurized air external of the high pressure engine case connected in fluid communication with an air passage of the air cap, a source of liquid fuel external of the high pressure case connected in fluid communication with a fuel injector in the cap, and a source of pressurized oxygen containing gas external of the high pressure engine case connected in fluid communication with the cap.

A further embodiment of any of the foregoing systems can further comprise a plurality of main fuel injectors mounted to the main combustor, wherein the torch combustion chamber is outside of the main combustor, and wherein none of the main fuel injectors includes a combustion chamber outside of the main combustor.

A further embodiment of any of the foregoing systems can further comprise a control valve in line between the source of pressurized oxygen containing gas and the cap wherein the control valve is configured to control supply from the source of pressurized oxygen containing gas to the cap.

A further embodiment of any of the foregoing systems, wherein the source of oxygen containing gas is a source of oxygen.

A further embodiment of any of the foregoing systems, wherein the source of oxygen containing gas is source of air.

An embodiment of a method includes issuing liquid from a fuel injector into a combustion chamber of a torch ignitor, issuing air from the fuel injector into the combustion chamber, issuing a separate stream of assist gas into the combustion chamber, igniting a fuel air mixture within the combustion chamber, and reducing the separate stream of assist gas into the combustion chamber after the fuel air mixture is ignited.

The method of the preceding paragraph can optionally include using flame issued from the combustion chamber to ignite a fuel/air mixture in a main combustor of a gas turbine engine.

A further embodiment of any of the foregoing methods, wherein using flame issued from the combustion chamber includes relighting the gas turbine engine after in-flight flame out.

A further embodiment of any of the foregoing methods, wherein reducing the separate stream of assist gas includes completely deactivating the separate stream of assist gas.

A further embodiment of any of the foregoing methods, wherein the assist gas includes at least one of air and/or oxygen.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
    issuing liquid from a fuel injector into a combustion chamber of a torch ignitor;
    issuing air from the fuel injector into the combustion chamber;
    issuing a separate stream of assist gas into the combustion chamber via a passage passing through a cap defining the axially upstream end of the combustion chamber and oriented about an axis from an exterior of the combustion chamber, while issuing air from the fuel injector;
    flowing the liquid from the fuel injector, the air from the fuel injector, and the stream of assist gas into the combustion chamber to form a first fuel-air mixture;
    igniting the first fuel-air mixture within the combustion chamber via a resistive heating element; and
    reducing the separate stream of assist gas into the combustion chamber after the first fuel-air mixture reaction is sustained but while the first fuel-air mixture is ongoing.

2. The method as recited in claim 1, further comprising using combustion products issued from the combustion chamber to ignite a second fuel-air mixture in a main combustor of a gas turbine engine.

3. The method as recited in claim 2, wherein using combustion products issued from the combustion chamber includes relighting the gas turbine engine after in-flight flame out using the second fuel-air mixture.

4. The method as recited in claim 1, wherein reducing the separate stream of assist gas includes completely deactivating the separate stream of assist gas.

5. The method as recited in claim 1, wherein the separate stream of assist gas includes at least one of air and/or oxygen.

* * * * *